United States Patent
Coffman et al.

(10) Patent No.: US 7,533,025 B2
(45) Date of Patent: May 12, 2009

(54) METHOD AND APPARATUS FOR DYNAMIC MODIFICATION OF COMMAND WEIGHTS IN A NATURAL LANGUAGE UNDERSTANDING SYSTEM

(75) Inventors: Daniel Mark Coffman, Bethel, CT (US); Jan Kleindienst, Kladno (CZ); Ganesh N. Ramaswamy, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/761,079

(22) Filed: Jun. 11, 2007

(65) Prior Publication Data

US 2007/0225969 A1   Sep. 27, 2007

Related U.S. Application Data

(63) Continuation of application No. 10/654,205, filed on Sep. 3, 2003, now Pat. No. 7,349,845.

(51) Int. Cl.
*G10L 21/00* (2006.01)
*G10L 15/08* (2006.01)
*G06F 17/27* (2006.01)

(52) U.S. Cl. ........................ 704/275; 704/9; 704/257
(58) Field of Classification Search ................ 704/257
See application file for complete search history.

(56) References Cited

U.S. PATENT DOCUMENTS

| | | | |
|---|---|---|---|
| 6,308,157 B1 * | 10/2001 | Vanbuskirk et al. | 704/275 |
| 6,622,119 B1 * | 9/2003 | Ramaswamy et al. | 704/9 |
| 6,895,380 B2 * | 5/2005 | Sepe, Jr. | 704/275 |
| 2003/0046073 A1 * | 3/2003 | Mori et al. | 704/251 |
| 2004/0148170 A1 * | 7/2004 | Acero et al. | 704/257 |

FOREIGN PATENT DOCUMENTS

JP   407306847 A   * 11/1995

OTHER PUBLICATIONS

IBM Technical Disclosure Bulletin (NN9307535), "Context Based Next Command Prediction", vol. 36, issue 7, p. 535-538, Jul. 1993.*

* cited by examiner

*Primary Examiner*—David R Hudspeth
*Assistant Examiner*—Matthew J Sked
(74) *Attorney, Agent, or Firm*—Yee & Associates, P.C.; Anne V. Dougherty

(57) ABSTRACT

A method and system for dynamically assigning weights to the subset of commands in a natural language dialog system based on prior context of the user's interaction with the system. The search space of the translation process may be reduced when some context information is available. A user presents input to the natural language understanding system. The system translates the user input into a formal command and calculates a weight value for a next set of formal commands based on the formal command. The command weights may then be dynamically boosted for the next set of formal commands before executing the formal command. The exemplary aspects of the present invention reduce the time needed to complete a task since the search space of the translation process may be reduced if context information is available and improve the accuracy of the process by using knowledge that users regularly use repeating patterns for repeating tasks.

15 Claims, 2 Drawing Sheets

METHOD AND APPARATUS FOR DYNAMIC MODIFICATION OF COMMAND WEIGHTS IN A NATURAL LANGUAGE UNDERSTANDING SYSTEM

This application is a continuation of application Ser. No. 10/654,205, filed Sep. 3, 2003 now U.S. Pat. No. 7,349,845, status: pending.

BACKGROUND OF THE INVENTION

1. Technical Field

This invention is related to building computer systems with natural language understanding and dialog management capabilities, and more particularly to a method and system for context-based dynamic assignment of weights for the user's commands for these systems.

2. Description of Related Art

Natural language understanding (NLU) systems enable computers to understand and extract information from human speech. Such systems may function in a complimentary manner with a variety of other computer applications, such as a speech recognition system, where there exists a need to understand human speech. NLU systems may extract relevant information contained within text and then supply this information to another application program or system to perform a desired task.

Conventional NLU systems typically attempt to translate the user's input to a formal command by searching the whole space of formal language commands, without considering reducing the search space of the translation process. In other words, the translation step is done without considering the prior context of interaction, without using the knowledge of the user's favorite interaction sequences, and without considering the access modality used in the interactions. As users regularly use repeating patterns for repeating tasks, this knowledge may be used to improve accuracy of the natural language understanding, reduce the need for explicit user's disambiguation and thus improve task completion time and increase user satisfaction.

Therefore, it would be beneficial to have a method and apparatus for reducing the search space of the translation process when some context information is available. More particularly, it would be beneficial to have a method and apparatus that dynamically assigns weights to the subset of commands in a natural language dialog system in order to improve the accuracy of the system, decrease task completion time, and resolve command ambiguities without the user's intervention.

SUMMARY OF THE INVENTION

The present invention provides a method and system for dynamically assigning weights to the subset of commands in a natural language dialog system based on prior context of the user's interaction with the system. With the method and system of the present invention, the search space of the translation process may be reduced when some context information is available. A user presents input to the natural language understanding system. The system translates the user input into a formal command and calculates a weight value for a next set of formal commands based on the formal command. The command weights may then be dynamically boosted for the next set of formal commands before executing the formal command. The exemplary aspects of the present invention reduce the time needed to complete a task since the search space of the translation process may be reduced if context information is available. In addition, the exemplary aspects of the present invention improve the accuracy of the natural language understanding process by using knowledge that users regularly use repeating patterns for repeating tasks.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a method and apparatus for using context information to reduce the space in which a statistical NLU may search for a translation of a user's input. When some context information is available, the statistical NLU may search for the best translation of a given user utterance within a subspace of the formal language space, rather than searching the entire space of formal language statements. Alternatively, user commands may be assigned a weight value based on the context of the user's interaction with the NLU system. The command weights within the subspace of the formal language space may be boosted with respect to the entire space, and this assignment of weights may be done dynamically. For example, in the conversational interface to an email and calendar application, if the user says, "let me process all the email that I received from David," the subset of the commands relevant to this user's declared intention may be searched rather than searching among all the commands, or the weights for this subset may be boosted, thereby increasing the accuracy of generating a correct translation of the user input. The boosted weights may be reset to default values after the next command, when another component of the system (such as a "dialog engine") explicitly issues a reset ( ) command, or they may be allowed to decay with time.

Figure 1:
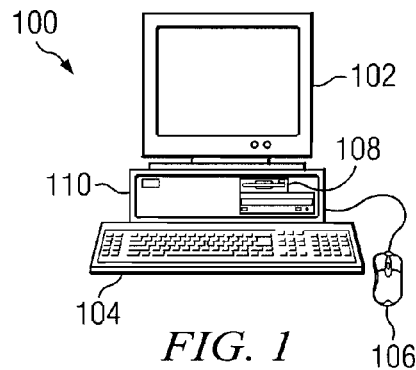
FIG. 1 is a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 may be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
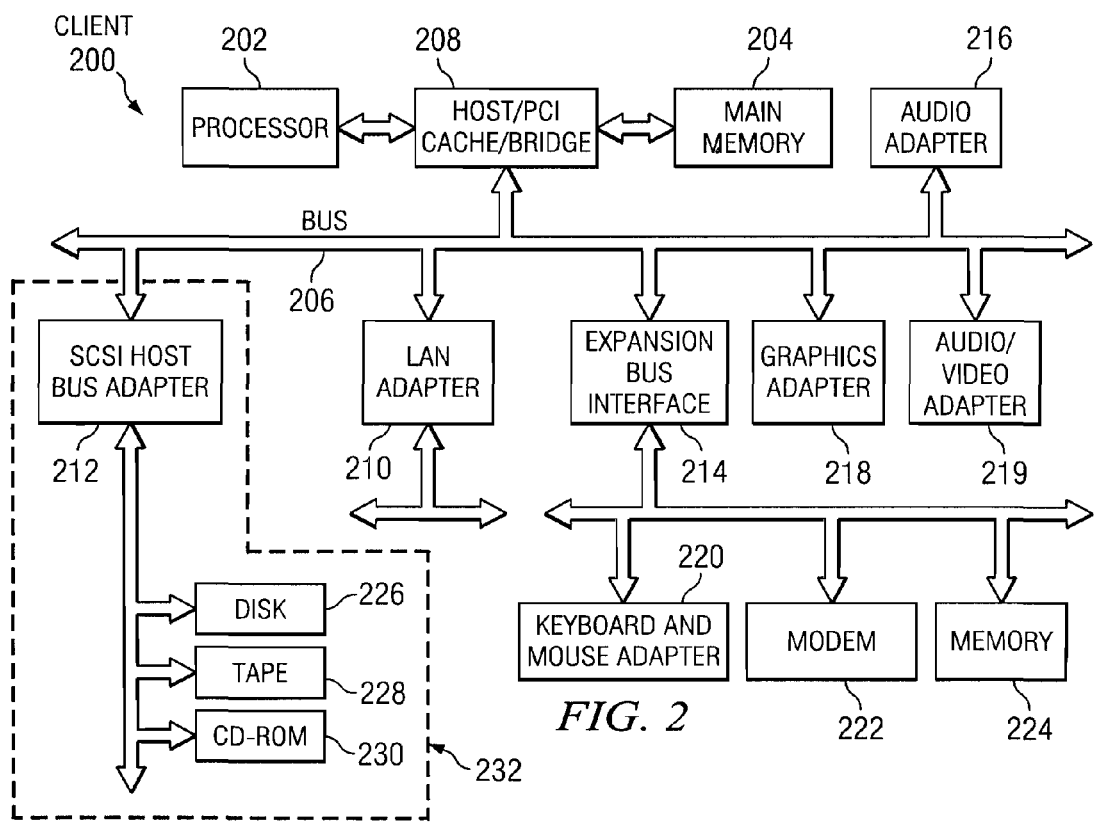
FIG. 2, a block diagram of a data processing system is shown in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

As mentioned previously, the present invention provides a method and system for using context information to reduce the space in which a statistical NLU may search for a translation of a user's input. When executing a repeating task, users of dialog systems often use the same set of commands in a particular phase of task execution. Such command patterns may consist of command sequences, a set of commands used to complete a particular task, or simply a set of favorite commands. Further, when the system allows for multiple input modalities (typed text, mouse clicks, spoken input, handwritten input, gestures, etc.), or access from multiple devices (desktop computer, telephone, personal digital assistant, etc.), then additional command patterns may be also executed, such as preference for certain commands when a particular input modality or a particular input device is used.

If the interaction patterns exhibited by the users are captured using a statistical model, then the model may be used both to (a) improve the accuracy of the natural language understanding process used to interpret the user input, and (b) speed up the translation process by working on command subsets.

Consider for example, a natural language dialog system for interacting with an electronic mail and calendar applications. A user may say "let me process all the email that I received from David," in which case the translation may search the subset of the commands relevant to this user's declared intention, rather than searching among all the commands. Alternatively, the weights for this subset may be boosted, thereby increasing the accuracy of the translation. In another example, the user creating a new message may ask for the message to be sent or to be saved. The system may predict the most probable choice, and assign higher weights to the subset consisting of "send" and "save" commands that are likely to follow. When the user subsequently presents one of these two inputs, the input may be interpreted more accurately.

Figure 3:
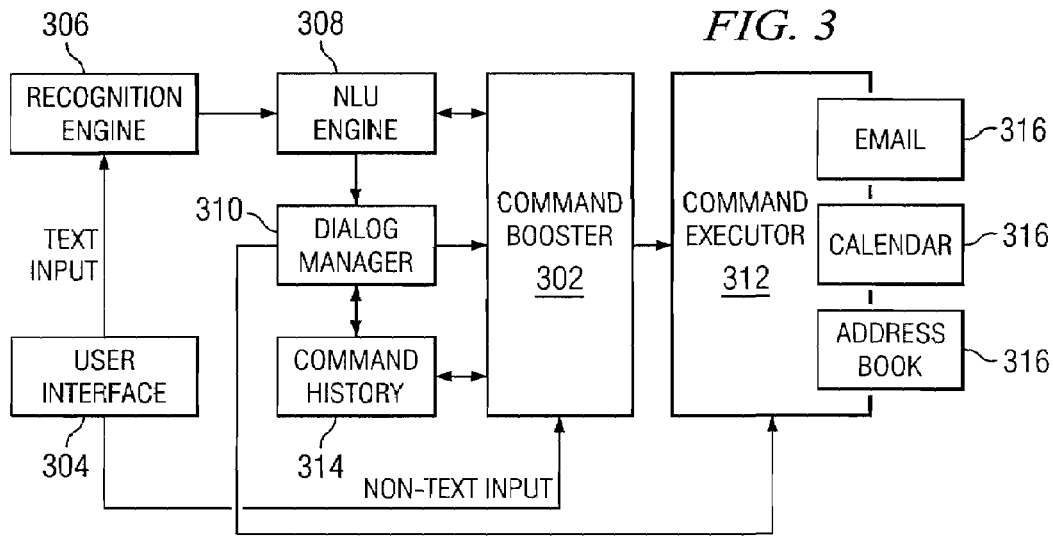
FIG. 3 is a block diagram of an example of a natural language dialog system that includes a command booster in accordance with the present invention.

FIG. 3 is a block diagram of an example of a natural language dialog system 300 that includes a command booster 302, in accordance with a preferred embodiment of the present invention. The user submits the command input through user interface 304. User input may originate from one of many different devices, such as a desktop computer, a telephone, a personal digital assistant, a two-way pager, etc. User input may also be in one of many different modalities, such as spoken input, handwritten input, gestures, typed text, other keyboard and mouse actions, etc. User inputs that require translation to text form, such as spoken or handwritten inputs, are submitted to recognition engine 306, which converts user input to text form. Methods for speech recognition and handwriting recognition are known in the art. User inputs that require translation to text form are submitted to natural language understanding (NLU) engine 308, which converts text input to a formal command, suitable for execution by the computer. For instance, in the example of electronic mail application described above, if the user input is, "do I have any new messages," the corresponding formal language command may be: checkNewMail( ).

The formal command generated by NLU engine 308 is submitted to dialog manager 310. The formal command is also submitted to command booster 302 to compute weights for a subset of next potential commands. Dialog manager 310 resolves any ambiguities that may be present in the formal command, and submits the formal command to command executor 312 for execution of the command.

Non-text inputs for which conversion to text is not appropriate, such as mouse clicks, are submitted by user interface 304 directly to command executor 312 for execution of the command, and to command booster 302 for computing weights of the user's next commands.

Command booster 302 uses command history 314 to determine the subset of commands to be boosted. Examples of command history include information about the history of previous issues commands, the input modality, and the application context.

Figure 4:
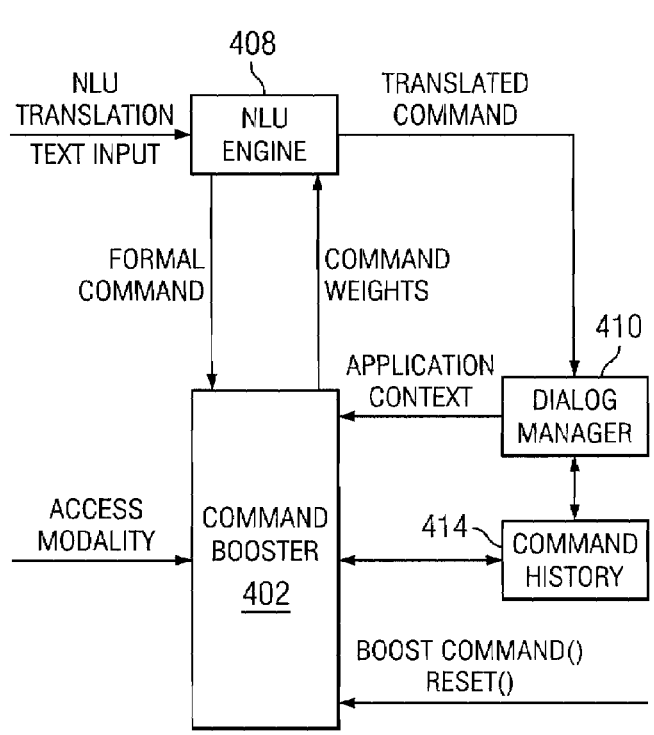
FIG. 4 is a block diagram of an example of a command booster, in accordance with the present invention.

FIG. 4 is a block diagram of an example of a command booster, in accordance with a preferred embodiment of the present invention. A user command or input is sent to command booster 402 from one of two devices. For user input modes that require conversion to formal commands, such as speech, handwriting or typed text inputs, the user input is sent to command booster 402 from NLU engine 408. For user input modes that do not require conversion to formal command, such as mouse clicks, the user input is sent to command booster 402 directly from user interface 304. User interface 304 is also responsible for providing the access method of each user input to command history 414, as well as to command booster 402. Command history 414 stores the commands issued by the user and the mode of user input, or access modality. Command booster 402 uses the information about command history 414, the mode of user access, and the application context to compute the weights of the next set of commands. The weights, expressed as command conditional probabilities, cause the formal commands to be ranked based on their corresponding conditional probability. A list containing the ranked formal commands and its associated probabilities is presented from command booster 402 to NLU engine 408. The list is sent to NLU engine 408 only for the modalities that require NLU conversion. In case of non-conversion input, such a list is sent only to command history 414 where it could be later referenced if necessary.

NLU engine 408 combines this information with the probability of the command on the input and presents the top ranking commands to dialog manager 410.

For each user input, the command booster computes the weights of the next set of user commands. The weights, expressed as command conditional probabilities, cause the formal commands to be ranked based on their corresponding conditional probability. If the formal command to be chosen at time t is denoted as $F_t$, the current access method at time t to be $M_t$, then the command booster computes the weights based on the following conditional probability of the formal command:

$$P(F|F_{t-1}, F_{t-2}, \ldots, F_1, M_t, T_t, T_{t-1}, \ldots, T_1) \quad (1)$$

Here the set $(F_{t-1}, F_{t-2}, \ldots, F_1)$ represents the command history, consisting of all previously chosen commands in a given session. The set $(T_t, T_{t-1}, \ldots, T_1)$ represents the task history, consisting of the current application task and previously executed tasks. The task history is supplied to command booster 402 by dialog manager 410. It is practical to use only one or two most recent tasks in the computation, as in our experience the information value of more distant tasks tend to diminish. In component-based GUI applications, the sequence $(T_t, T_{t-1}, \ldots, T_1)$ is component-specific and may change even within a dialog turn depending on which component has the focus. For example, in the email, calendar, and address book system 316 in FIG. 3, each individual component will have a separate task history.

As stated above, dialog manager 410 supplies the application context, or task history, used in calculating the command weights to command booster 402. By definition, dialog manager 410 possesses the complete notion of application context. The context is defined as a sequence of tasks. Some of the tasks are application-specific, while some of them are general, reusable across applications. For example, an email application comprises specific tasks such as "create email," "receive email," "find email," as well as general tasks such as "confirm." The formal commands given by the user should correspond to the task(s) in progress. There are two ways how dialog manager 410 determines the boosting weights and thus the translation of the formal statement:

a) implicit—by updating the task history that is presented to the command booster b) explicit—by requesting boosting for an explicitly defined set of commands Working in the implicit mode, dialog manager 410 relies on the statistical model pre-computed from the training data. In this mode, the command weights are updated on each dialog turn.

For certain tasks, such as confirmation, it is more useful to switch to the explicit mode, and use explicit rules to control the commands that should be boosted for a given task (e.g. "yes," "yap," "no," "negative," etc.). In the explicit mode, dialog manager 410 may also select from various boosting strategies, determined, e.g. by the application designer. Thus, the commands may be boosted for a single-dialog turn, for the duration of the current task (thus spanning several dialog turns), or for the complete session. Moreover, dialog manager 410 may turn off the boosting completely using the reset ( ) command, or allow the boosted weights to decay with time.

The manner in which the conditional probabilities are used by the NLU engine depends on the type of NLU engine that is used. There are many methods known in the art for building NLU engines, such as the one described in Epstein, M. Papineni, K., Roukos, S., Ward, T., and Della Pietra, S. "Statistical Natural Language Understanding Using Hidden Clumpings," IEEE ICASSP Proceedings, Vol. 1, pp. 176-179, May 1996, which is incorporated herein by reference. As noted earlier, state-of-the-art NLU engines attempt to translate a given user input S to formal command F in isolation, and typically do not consider the command history, the access method information, the application context, and the formulation often used is to find the formal command, $F_t$ for a given input $S_t$ at time t by $$F_t = \mathrm{argmax}_F P(F) P(S_t|F) \quad (2)$$

Here $P(S_t|F)$ comes from a translation model built using a large amount of training data. An example of how to build this model is described in the Epstein reference cited above. The quantity P(F) is the prior probability for a given formal command F, and is usually assumed to be uniform. That is, P(F) is set to a constant for all F.

This invention provides a simple method to use command history, access method, and application context for NLU engines that are built on the basis of equation (2) above. The conditional probability calculated from equation (1) may be used instead of the uniform model P(F) in equation (2), so that now the formal command $F_t$ is selected for a given input $S_t$ according to $$F_t = \mathrm{argmax}_F P(F|F_{t-1}, F_{t-2}, \ldots, F_1, M_t, T_t, T_{t-1}, \ldots, T_1) P(S_t|F) \quad (3)$$

With this formulation, formal commands that are considered more likely, given the command history, access method information, and application context, are given higher weights, and the commands that are less likely are given lower weights, rather than the naïve uniform weight given by P(F). Using equation (3) instead of equation (2) will therefore improve the accuracy and increase the speed of the NLU engine.

The apparatus for boosting the weights of a subset of commands relies on a mechanism for selecting the subset based on context. In one exemplary embodiment of the present invention, for example, the subset of commands is determined based on the predicted command probabilities. The weights boosted in one dialog turn may be reset to default values after the next command or when another component of the system (such as a "dialog engine") explicitly issues a reset ( ) command, or they may be allowed to decay with time.

Figure 5:
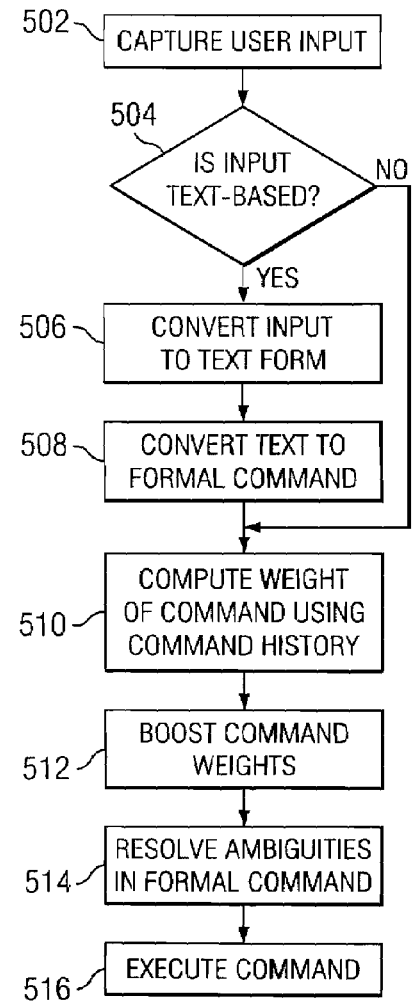
FIG. 5 is a flowchart depicting a process in the logical design in accordance with the present invention.

FIG. 5 is a flowchart outlining an exemplary operation of the present invention. It will be understood that each block of the flowchart illustrations, and combinations of blocks in the flowchart illustrations, may be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that may direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, may be implemented by special purpose hardware-based computer systems which perform the specified functions or steps, or by combinations of special purpose hardware and computer instructions.

As shown in FIG. 5, the natural language dialog process begins with capturing the user input (step 502). The user input may be text-based (e.g. spoken or handwritten) or nontext-based (e.g. mouse click or gestures). If it is determined that the user input is text-based (step 504), the input is converted into text form (step 506). This step may be performed using a recognition engine as known in the prior art. The text input is then converted into a formal command (step 508). This step may be performed using an NLU engine as known in the prior art. A weight value is then calculated for the formal command (step 510). A command booster computes the weights of the next set of user commands in order to rank the formal commands based on their corresponding conditional probability. This computation is based on the given command history, access method information, and application context. Greater translation accuracy may be achieved by boosting the command weights for a subset of the formal command space (step 512). This process may be performed dynamically. Thus, instead of using uniform command weights when translating user input, formal commands that are considered more likely are given higher weights, and the commands that are less likely are given lower weights. Any ambiguities in the formal command are resolved (step 514). The formal command is then executed by the application (step 516).

Thus, the exemplary embodiment of the present invention provides a method and system for dynamically boosting the weights of a subset of commands, and a mechanism for selecting the subset based on context. The advantages of the present invention should be apparent in view of the detailed description provided above. One may use existing methods of natural language understanding systems to translate a given user input to a formal command. However, such prior methods translate the input in isolation, and typically do not consider the command history, the access method information, the application context. In contrast, the present invention is an dynamic process that improves the accuracy of the natural language under standing process used to interpret user input and speeds up the translation process by working on command subsets by searching for the best translation within a subspace of the formal language space or boosting the command weights for a subset with respect to the entire space.

It is important to note that while the exemplary embodiment of the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the exemplary embodiment of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for context-based dynamic assignment of weights for formal commands in a natural language understanding system, comprising:

receiving a user input;

determining whether the user input is text-based;

responsive to determining that the user input is text-based, converting the user input into a text form to form a text input;

translating the text input into a formal command;

calculating a weight value for the formal command;

selecting a next set of formal commands;

determining weight values for the next set of formal commands based on the formal command before executing the formal command, wherein determining weight values for the next set of formal commands comprises computing weight values for the next set of formal commands based on a given command history, access method information, and application context, and wherein determining weight values for the next set of formal commands further comprises dynamically boosting command weights for a subset of formal commands of the next set of formal commands, wherein the subset of formal commands comprises a subset of formal commands that are considered more likely for translation of the user input than other formal commands of the set of formal commands and are given higher command weights than the other formal commands; and executing the formal command.

2. The method of claim 1, further comprising:

receiving a second user input; and translating the second user input into a formal command based on the boosted command weights.

3. The method of claim 1, further comprising:
resetting the boosted command weights to a default value.

4. The method of claim 3, wherein the step of resetting the boosted command weights includes automatically resetting the boosted command weights to the default value after the next set of formal commands are executed.

5. The method of claim 3, wherein the step of resetting the boosted command weights includes issuing a reset command by a dialog manager.

6. A data processing system for context-based dynamic assignment of weights for formal commands in a natural language understanding system, comprising:
a processor, the processor comprising:
means for receiving a user input;
means for determining whether the user input is text-based;
means responsive to determining that the user input is text-based, for converting the user input into a text form to form a text input;
means for translating the text input into a formal command;
means for selecting a next set of formal commands;
means for determining weight values for the next set of formal commands based on the formal command before executing the formal command, wherein determining weight values for the next set of formal commands comprises computing weight values for the next set of formal commands based on a given command history, access method information, and application context, and wherein the means for determining weight values for the next set of formal commands further comprises means for dynamically boosting command weights for a subset of formal commands of the next set of formal commands, wherein the subset of formal commands comprises a subset of formal commands that are considered more likely for translation of the user input than other formal commands of the set of formal commands and are given higher command weights than the other formal commands; and
means for executing the formal command.

7. The data processing system of claim 6, further comprising:
means for receiving a second user input; and
means for translating the second user input into a formal command based on the boosted command weights.

8. The data processing system of claim 6, further comprising:
means for resetting the boosted command weights to a default value.

9. The data processing system of claim 8, wherein the means for resetting the boosted command weights includes means for automatically resetting the boosted command weights to the default value after the next set of formal commands are executed.

10. The data processing system of claim 8, wherein the means for resetting the boosted command weights includes means for issuing a reset command by a dialog manager.

11. A computer program product comprising:
a computer readable recordable-type storage medium storing computer usable program code for context-based dynamic assignment of weights for formal commands in a natural language understanding system, the computer program product comprising:
computer usable program code for receiving a user input;
computer usable program code for determining whether the user input is text-based;
responsive to determining that the user input is text-based, computer usable program code for converting the user input into a text form to form a text input;
computer usable program code for translating the text input into a formal command;
computer usable program code for selecting a next set of formal commands;
computer usable program code for determining weight values for the next set of formal commands based on the formal command before executing the formal command, wherein the computer usable program code for determining weight values for the next set of formal commands comprises computer usable program code for computing weight values for the next set of formal commands based on a given command history, access method information, and application context, and wherein the computer usable program code for determining weight values for the next set of formal commands further comprises computer usable program code for dynamically boosting command weights for a subset of formal commands of the next set of formal commands, wherein the subset of formal commands comprises a subset of formal commands that are considered more likely for translation of the user input than other formal commands of the set of formal commands and are given higher command weights than the other formal commands; and
computer usable program code for executing the formal command.

12. The computer program product of claim 11, further comprising:
instructions for receiving a second user input; and
instructions for translating the second user input into a formal command based on the boosted command weights.

13. The computer program product of claim 11, further comprising:
instructions for resetting the boosted command weights to a default value.

14. The computer program product of claim 13, wherein the instructions for resetting the boosted command weights includes instructions for automatically resetting the boosted command weights to the default value after the next set of formal commands are executed.

15. The computer program product of claim 13, wherein the instructions for resetting the boosted command weights includes instructions for issuing a reset command by a dialog manager.

* * * * *